(12) United States Patent
Manickavasagam et al.

(10) Patent No.: US 8,687,503 B2
(45) Date of Patent: *Apr. 1, 2014

(54) TECHNIQUE FOR IDENTIFYING A FAILED NETWORK INTERFACE CARD WITHIN A TEAM OF NETWORK INTERFACE CARDS

(75) Inventors: Hemamalini Manickavasagam, San Jose, CA (US); Ayaz Abdulla, Sunnyvale, CA (US); Norman K. Chen, Sunnyvale, CA (US); Anand Rajagopalan, Saratoga, CA (US); Ashutosh K. Jha, Sunnyvale, CA (US); Thomas A. Maufer, Menlo Park, CA (US); Sameer Nanda, Cupertino, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,455

(22) Filed: Feb. 28, 2012

(65) Prior Publication Data
US 2012/0155249 A1   Jun. 21, 2012

Related U.S. Application Data

(63) Continuation of application No. 11/305,177, filed on Dec. 15, 2005, now Pat. No. 8,134,928.

(51) Int. Cl.
*H04L 1/00* (2006.01)

(52) U.S. Cl.
USPC .......................................... 370/242

(58) Field of Classification Search
USPC ................... 370/463, 229–242; 709/201–250
See application file for complete search history.

(56) References Cited

U.S. PATENT DOCUMENTS

| 6,512,774 | B1* | 1/2003 | Vepa et al. ..................... 370/401 |
| 2005/0281190 | A1 | 12/2005 | McGee et al. |
| 2006/0212435 | A1 | 9/2006 | Williams et al. |
| 2006/0212453 | A1 | 9/2006 | Eshel et al. |
| 2006/0248191 | A1* | 11/2006 | Hudson et al. ................. 709/226 |

OTHER PUBLICATIONS

Final Office Action, U.S. Appl. No. 11/750,914 dated Oct. 11, 2012.

* cited by examiner

*Primary Examiner* — Yemane Mesfin
*Assistant Examiner* — Wanda Z Russell
(74) *Attorney, Agent, or Firm* — Patterson & Sheridan, L.L.P.

(57) ABSTRACT

A method for identifying a failed network interface card in a system having two NICs configured as a team includes the steps of transmitting a first data packet from the first NIC to a third NIC, wherein the third NIC is not a member of the team, and transmitting a second data packet from the first NIC to the second NIC or from the second NIC to the third NIC, depending on whether the third NIC responds to the transmission of the first data packet. One advantage of the disclosed method is that it specifically identifies which NIC within the team has failed, which is something that cannot be determined by simply exchanging packets between the two NICs.

21 Claims, 8 Drawing Sheets

TECHNIQUE FOR IDENTIFYING A FAILED NETWORK INTERFACE CARD WITHIN A TEAM OF NETWORK INTERFACE CARDS

CROSS-REFERENCE TO RELATED APPLICATIONS

This application is a continuation of co-pending U.S. patent application entitled "TECHNIQUE FOR IDENTIFYING A FAILED NETWORK INTERFACE CARD WITHIN A TEAM OF NETWORK INTERFACE CARDS", Ser. No. 11/305,177, filed Dec. 5, 2005, hereby incorporated herein by reference.

BACKGROUND OF THE INVENTION

1. Field of the Invention

Embodiments of the present invention relate generally to the field of computer networking and more specifically to a technique for identifying a failed network interface card within a team of network interface cards.

2. Description of the Related Art

Modern computing devices may have one or more network interface cards (NICs) in a single system. This plurality of NICs allows the computing device to increase the system's communication bandwidth beyond what a single NIC could provide and is commonly referred to as a "team" of NICs. Typically, the team of NICs shares a common Internet Protocol (IP) address while they may or may not retain a unique Media Access Control (MAC) addresses for each NIC. One aspect of using this team configuration is that network traffic between the computing device and other computing devices in the network may be distributed among the NICs in the team such that the overall throughput of the team may be maximized. This type of operation is referred to as "load balancing." Another aspect of using a team configuration is that traffic may be migrated from a nonfunctional or unreliable NIC within the team to a functional or more reliable NIC within the team. This type of operation is referred to as "failover." Both operations require the capability to identify communication faults in the computer network on an ongoing basis.

In a networked computing environment, any component (the switch, the networking cables, or the NICs) in the network may become faulty, leading to poor network reliability. The difficulty of diagnosing network faults is exacerbated by the possibility that a NIC may experience a partial failure, in that it may not be able to receive data without having the capability to transmit data (or the reverse). Finally, it is possible for a NIC to transmit and receive data, but for that data to be exchanged with a substantially higher error rate than is desired. The higher error rate may lead to substantial retransmissions of data and an unacceptable increase in overall network traffic.

One method of identifying a faulty NIC within a team of NICs is to transmit "keep-alive" packets between the NICs to verify that data is being received and transmitted properly between the various NICs. These keep-alive packets are additional packets generated exclusively for the purpose of verifying network connectivity (the simultaneous capability to receive and transmit data from each NIC). Typically, the NIC device driver in the operating system generates and manages the keep-alive packets.

In a computing device containing a team of two NICs, a common method for monitoring the reliability of the two NICs is to transmit a first keep-alive packet from the first NIC to the second NIC and then to transmit a second keep-alive packet from the second NIC to the first NIC. If both keep-alive packets are successfully received, the transmission and reception capabilities of both NICs are confirmed for the current round of testing, called a "keep-alive cycle." On the other hand, if one or both packets are not received, then a problem clearly exists with at least one of the NICs or with their interconnection network (the cable(s) and/or the switch(es)).

Although this approach may be used to identify situations where a NIC within the team has failed (for transmitting or receiving or both), one disadvantage of the approach is that when there are only two NICs in a team, this technique does not identify which specific NIC within the team that has failed. Without knowing the location of the faulty NIC, the computing device cannot failover the existing communications to the fully functional NIC.

In a computing device containing a team of three or more NICs, a common method for monitoring the reliability of the three NICs is for each NIC to transmit a keep-alive packet to every other NIC in the team. For example, in a three NIC team, the first NIC would first transmit a keep-alive packet to both the second NIC and the third NIC. Then, the second NIC would transmit a keep-alive packet to the third NIC and the first NIC. Finally, the third NIC would transmit a keep-alive packet to the first NIC and the second NIC. In the event one NIC of the three NICs in the team fails (i.e. has a transmission or reception problem), the failed NIC is easily identifiable since the remaining NICs are able to transmit and receive the keep-alive packets.

One disadvantage of this approach is that each NIC in the team transmits keep-alive packets to every other NIC in the team, generating substantial network traffic, a problem which becomes especially when a team has a large number of members. This problem is exacerbated when keep-alive packets are sent frequently.

As the foregoing illustrates, what is needed in the art is a more efficient technique for identifying a failed NIC within a team of NICs.

SUMMARY OF THE INVENTION

One embodiment of the present invention sets forth a method for identifying a failed network interface card in a system having two NICs configured as a team. The method includes the steps of transmitting a first data packet from the first NIC to a third NIC, wherein the third NIC is not a member of the team, and transmitting a second data packet from the first NIC to the second NIC or from the second NIC to the third NIC, depending on whether the third NIC responds to the transmission of the first data packet.

One advantage of the disclosed technique is that it specifically identifies which NIC within a team of two NICs has failed. Such a determination cannot be made by simply exchanging keep-alive packets between the two NICs comprising the team. Thus, the disclosed technique is capable of identifying a fault that was not previously identifiable, providing important diagnostic information for and potentially improving the reliability of computer networks.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
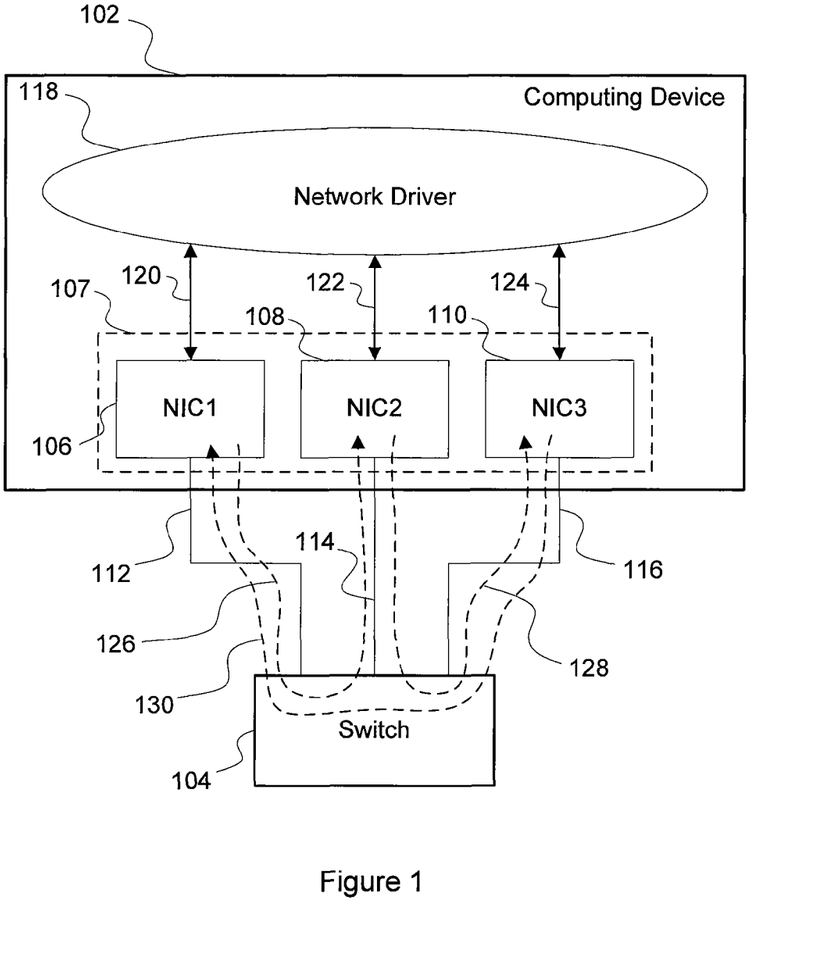
FIG. 1 illustrates a computing device that includes three NICs configured as a team, according to one embodiment of the invention.

FIG. 1 illustrates a computing device 102 that includes a first NIC 106, a second NIC 108 and a third NIC 110 configured as a team 107, according to one embodiment of the invention. Each of the NICs 106, 108 and 110 is controlled by a network driver 118 through a series of hardware/software interfaces 120, 122 and 124, respectively. The computing device 102 communicates with other computing devices (not shown) in a computer network through a series of network connections 112, 114 and 116 between the NICs 106, 108 and 110, respectively, and to a switch 104.

As set forth in greater detail below, the present invention provides a technique for identifying a failed NIC within the team 107 as well as the nature of the failure (transmit-only versus receive-only capability) using a minimum number of keep-alive packets. The inventive technique also may be used to confirm that all NICs within the team 107 are functioning properly using a minimum number of packets. In this latter scenario, each of NICs 106, 108 and 110 transmits and receives a single keep-alive packet within a keep-alive cycle, as set forth in FIG. 1. A first keep-alive packet is transmitted from the first NIC 106 to the second NIC 108 along a communication path 126. A second keep-alive packet is then transmitted from the second NIC 108 to the third NIC 110 along a communication path 128. Finally, a third keep-alive packet is transmitted from the third NIC 110 to the first NIC 106 along a communication path 130. So long as NICs 106, 108 and 110 are fully functional, this series of transmissions is simply repeated at some predetermined frequency. Transmitting and receiving single keep-alive packets in this fashion is referred to herein as a "round-robin" scheme for keep-alive communications. If a potential fault is detected, though, then a more targeted series of keep-alive packet transmissions is used to identify the location and nature of the fault.

Figure 2A:
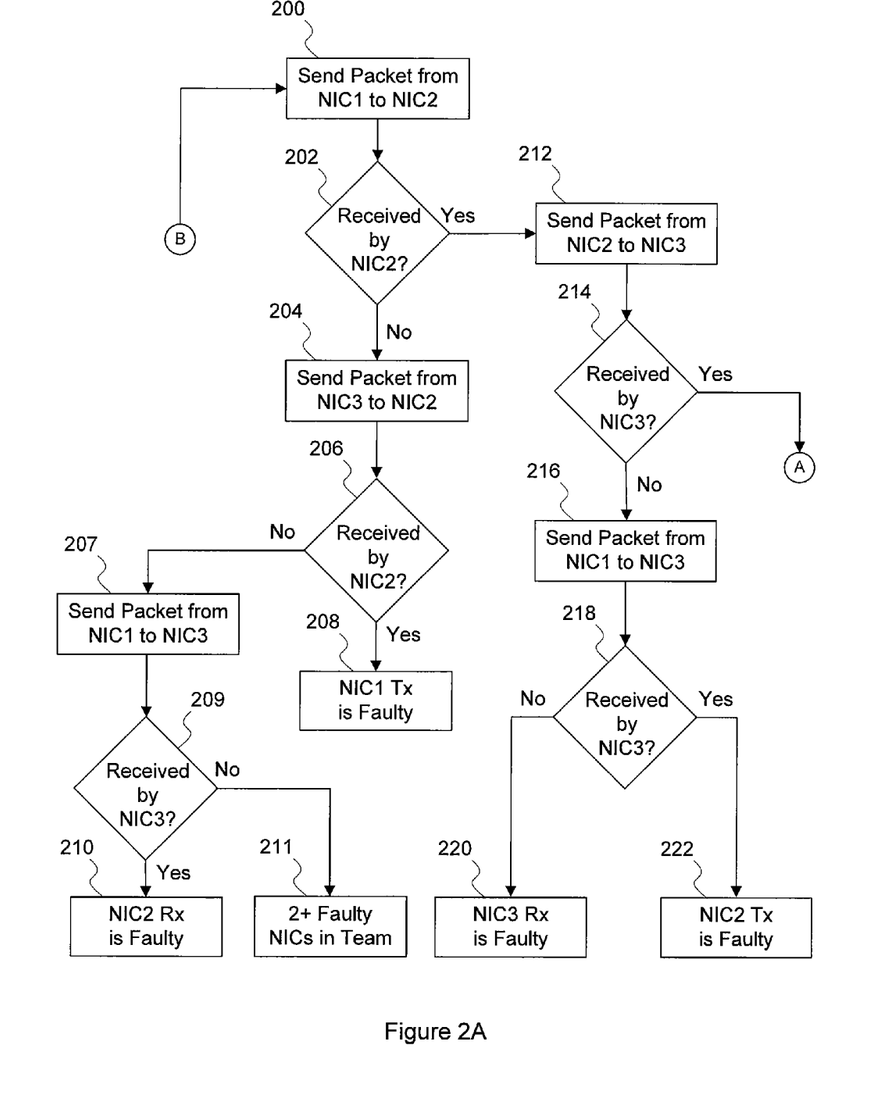
FIGS. 2A and 2B illustrate a flowchart of method steps for identifying a faulty NIC within a team of NICs, according to one embodiment of the invention.
Figure 2B:
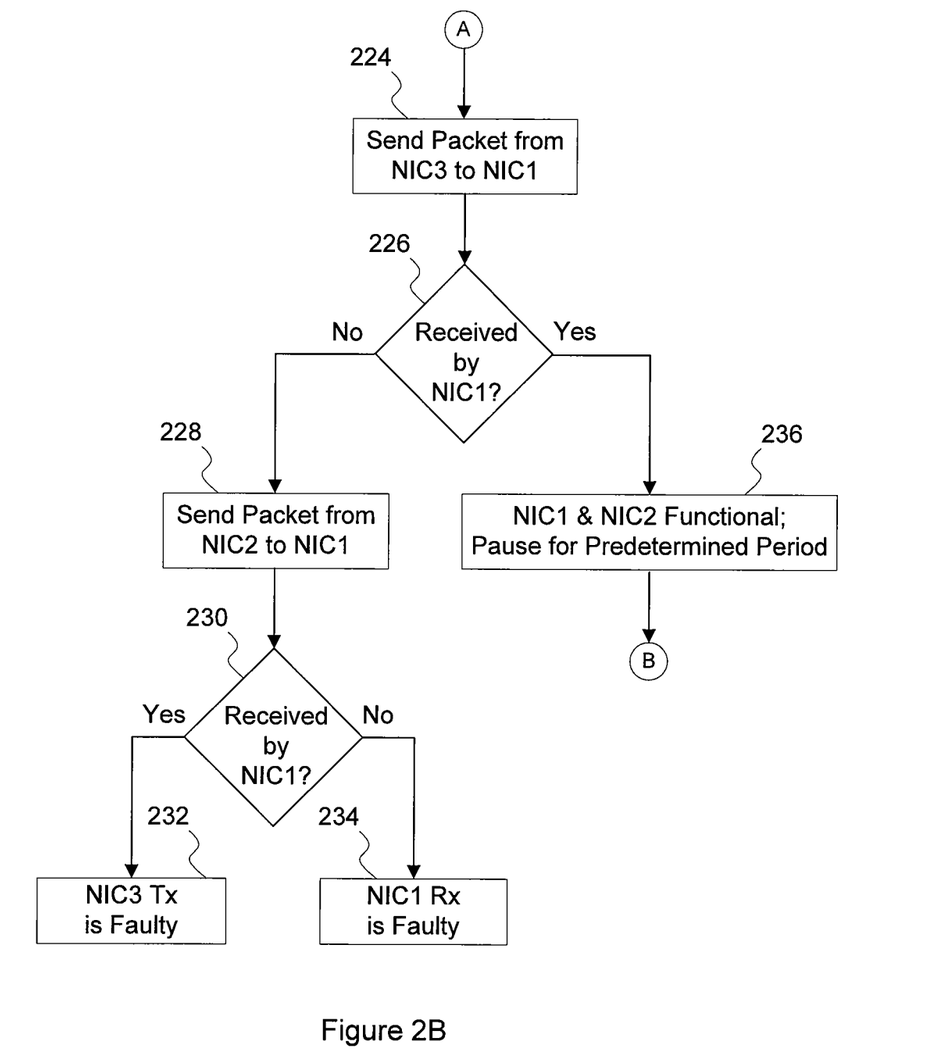

FIGS. 2A and 2B illustrate a flowchart of method steps for identifying a faulty NIC within the team 107 of FIG. 1, according to one embodiment of the invention. Although described in view of FIG. 1, persons skilled in the art will understand that any system configured to perform the method steps, in any order, is within the scope of the invention.

The method begins in step 200, where the network driver 118 transmits a keep-alive packet addressed to the second NIC 108 through the first NIC 106. In step 202, the network driver 118 determines whether the keep-alive packet was received by the second NIC 108. In one embodiment, the second NIC 108 notifies the network driver 118 upon receiving the keep-alive packet. If the second NIC 108 receives the keep-alive packet, then the network driver 118 deduces that the transmission capability of the first NIC 106 and the receiving capability of the second NIC 108 are functional. In step 212, the network driver 118 transmits a keep-alive packet to the third NIC 110 through the second NIC 108. In step 214, the network driver 118 determines whether the keep-alive packet was received by the third NIC 110. In one embodiment, the third NIC 110 notifies the network driver 118 upon receiving the keep-alive packet. If the third NIC 110 receives the keep-alive packet, then the network driver 118 deduces that the transmission capability of the second NIC 108 and the receiving capability of the third NIC 110 are functional. In step 224, the network driver 118 transmits a keep-alive packet to the first NIC 106 through the third NIC 110. In step 226, the network diver 118 determines whether the keep-alive packet was received by the first NIC 106. In one embodiment, the first NIC 110 notifies the network driver 118 upon receiving the keep-alive packet. If the first NIC receives the keep-alive packet, then the network driver 118 deduces that the transmission capability of the third NIC 110 and the receiving capability of the first NIC 106 are functional. In step 236, the network driver 118 combines the deduction of step 202 (that the transmission capability of the first NIC 106 and the receiving capability of the second NIC 108 are functional) with the deduction of step 214 (that the transmission capability of the second NIC 108 and the receiving capability of the third NIC 110 are functional) and the deduction of step 226 (that the transmission capability of the third NIC 110 and the receiving capability of the first NIC 106 are functional) to further deduce that all three NICs in the team 107 are fully functional. Further, so that the keep-alive packet exchanges may be repeated on a regular time interval, the network driver 118 pauses for a predetermined period of time and then restarts the method at the step 200.

Referring back now to step 202, if the second NIC 108 does not receive the keep-alive packet transmitted by the first NIC 106, then the network driver 118 deduces that either the transmission capability of the first NIC 106 is faulty or the reception capability of the second NIC 108 is faulty. The network driver 118 then begins a fault determination process in step 204 by transmitting a keep-alive packet to the second NIC 108 through the third NIC 110. In step 206, the network driver 118 determines whether the keep-alive packet was received by the second NIC 108. In one embodiment, the second NIC 108 notifies the network driver 118 upon receiving the keep-alive packet. If the second NIC 108 receives the keep-alive packet, then the network driver 118 deduces that the transmission capability of the third NIC 110 and the reception capability of the second NIC 108 are functional. In step 208, the network driver 118 combines the deduction from step 202 (that either the transmission capability of the first NIC 106 is faulty or the reception capability of the second NIC 108 is faulty) with the deduction from step 206 (that the transmission capability of the third NIC 110 and the reception capability of the second NIC 108 are functional) to further deduce that the fault seen in the step 202 is in the transmission capability of the first NIC 106, thereby concluding the fault determination process. At this point, the network driver 118 may failover network connections on the faulty first NIC 106 and/or may disable the first NIC 106 to avoid future communication issues. In one embodiment, the driver may choose to suspend use of NIC 106 for normal traffic, but may continue to attempt to engage it in the keep-alive process, so as to deduce when the NIC has returned to fully functional status.

If, in step 206, the second NIC 108 does not receive the keep-alive packet transmitted from the third NIC 110, then the network driver 118 deduces that either the transmission capability of the third NIC 110 is faulty or the reception capability of the second NIC 108 is faulty. The network driver 118 then continues the fault determination process in step 207 by transmitting a keep-alive packet to the third NIC 110 through the first NIC 106. In step 209, the network driver determines whether the keep-alive packet was received by the third NIC 110. In one embodiment, the third NIC 110 notifies the network driver 118 upon receiving the keep-alive packet. If the third NIC 110 receives the keep-alive packet, then the network driver 118 deduces that the transmission capability of the first NIC 106 and the reception capability of the third NIC 110 are functional. In step 210, the network driver 118 combines the deduction from step 202 (that either the transmission capability of the first NIC 106 is faulty or the reception capability of the second NIC 108 is faulty) with the deduction from step 209 (that the transmission capability of the first NIC 106 and the reception capability of the third NIC 110 are functional) to further deduce that the reception capability of the second NIC 108 is faulty, thereby concluding the fault determination process. At this point, the network driver 118 may failover network connections on the faulty second NIC 108 and/or may disable the second NIC 108 to avoid future communication issues. As above, in one embodiment, the driver may choose to suspend use of NIC 108 for normal traffic, but may continue to attempt to engage it in the keep-alive process, so as to deduce when the NIC has returned to fully functional status.

If, however, in step 209, the third NIC 110 does not receive the keep-alive packet, then the network driver 118 deduces that either the transmission capability of the first NIC 106 is faulty or the reception capability of the third NIC 110 is faulty. In step 211, the network driver 118 combines the deduction from step 202 (that either the transmission capability from the first NIC 106 is faulty or the reception capability of the second NIC 108 is faulty) with the deduction from step 206 (that either the transmission capability of the first NIC 106 is faulty or the reception capability of the second NIC 108 is faulty) and the deduction from step 209 (that either the transmission capability of the first NIC 106 is faulty or the reception capability of the third NIC 110 is faulty) to further deduce that more than one faulty NIC exists in the team 107. Since locating two simultaneously faulty NICs in a three-NIC team presents a host of well-known technical problems, this last deduction concludes the fault determination process.

Referring back now to step 214, if the third NIC 110 does not receive the keep-alive packet transmitted by the second NIC 108, then the network driver 118 deduces that either the transmission capability of the second NIC 108 is faulty or the reception capability of the third NIC 110 is faulty. The network driver 118 then begins a fault determination process in step 216 by transmitting a keep-alive packet to the third NIC 110 through the first NIC 106. In step 218, the network driver 118 determines whether the keep-alive packet was received by the third NIC 110. In one embodiment, the third NIC 110 notifies the network driver 118 upon receiving the keep-alive packet. If the third NIC 110 receives the keep-alive packet, then the network driver 118 deduces that the transmission capability of the first NIC 106 and the reception capability of the third NIC 110 are functional. In step 222, the network driver 118 combines the deduction from step 214 (that either the transmission capability of the second NIC 108 is faulty or the reception capability of the third NIC 110 is faulty) with the deduction from the step 218 (that the transmission capability of the first NIC 106 and the reception capability of the third NIC 110 are functional) to further deduce that the transmission capability of the second NIC 108 is faulty, thereby concluding the fault determination process. At this point, the network driver 118 may failover network connections on the faulty second NIC 108 and/or may disable the second NIC 108 to avoid future communication issues. As above, in one embodiment, the driver may choose to suspend use of NIC 108 for normal traffic, but may continue to attempt to engage it in the keep-alive process, so as to deduce when the NIC has returned to fully functional status.

If, however, in step 218, the third NIC 110 does not receive the keep-alive packet, then the network driver 118 deduces that either the transmission capability of the first NIC 106 is faulty or the reception capability of the third NIC 110 is faulty. In the step 220, the network driver 118 combines the deduction from the step 202 (that the transmission capability of the first NIC 106 and the reception capability of the second NIC 108 are functional) with the deduction from the step 218 (that either the transmission capability of the first NIC 106 is faulty or that the reception capability of the third NIC 110 is faulty) to further deduce that the reception capability of the third NIC 110 is faulty, thereby concluding the fault diagnosis process. At this point, the network driver 118 may failover network connections on the faulty third NIC 110 and/or, may disable the third NIC 110 to avoid future communication issues. As above, in one embodiment, the driver may choose to suspend use of NIC 108 for normal traffic, but may continue to attempt to engage it in the keep-alive process, so as to deduce when the NIC has returned to fully functional status.

Referring back now to step 226, if the first NIC 106 does not receive the keep-alive packet transmitted from the third NIC 110, then the network driver 118 deduces that either the transmission capability of the third NIC 110 is faulty or the reception capability of the first NIC 106 is faulty. The network driver 118 then begins a fault determination process in step 228 by transmitting a keep-alive packet to the first NIC 106 through the second NIC 108. In step 230, the network driver 118 determines whether the keep-alive packet was received by the first NIC 106. In one embodiment, the first NIC 106 notifies the network driver 118 upon receiving the keep-alive packet. If the first NIC 106 receives the keep-alive packet, then the network driver 118 deduces that the transmission capability of the second NIC 108 and the reception capability of the first NIC 106 are functional. In step 232, the network driver 118 combines the deduction from step 226 (that either the transmission capability of the third NIC 110 is faulty or the reception capability of the first NIC 106 is faulty) with the deduction from step 230 (that the transmission capability of the second NIC 108 and the reception capability of the first NIC 106 are functional) to further deduce that the transmission capability of the third NIC 110 is faulty, thereby concluding the fault determination process. At this point, the network driver 118 may failover network connections on the faulty third NIC 110 and/or may disable the third NIC 110 to avoid future communication issues. As above, in one embodiment, the driver may choose to suspend use of NIC 108 for normal traffic, but may continue to attempt to engage it in the keep-alive process, so as to deduce when the NIC has returned to fully functional status.

If, however, in step 230, the first NIC 106 does not receive the keep-alive packet, then the network driver 118 deduces that either the transmission capability of the second NIC 108 is faulty or the reception capability of the first NIC 106 is faulty. In step 234, the network driver 118 combines the deduction from step 214 (that the transmission capability of the second NIC 108 and the reception capability of the third NIC 110 are functional) with the deduction from step 230 (that either the transmission capability of the second NIC 108 is faulty or the reception capability of the first NIC 106 is faulty) to further deduce that the reception capability of the first NIC 106 is faulty, thereby concluding the fault determination process. Again, at this point, the network driver 118 may failover network connections on the faulty first NIC 106 and/or may disable the first NIC 106 to avoid future communication issues. As above, in one embodiment, the driver may choose to suspend use of NIC 108 for normal traffic, but may continue to attempt to engage it in the keep-alive process, so as to deduce when the NIC has returned to fully functional status.

In one embodiment, the keep-alive packets are proprietary TCP/IP or other packets configured as a custom (unique) ether-type to avoid confusion between the keep-alive packets and other network traffic. The methods for configuring such packets are well known by those skilled in the art. In alternative embodiments, any other technically feasible type of packet may be used as a keep-alive packet. Further, in alternative embodiments, the team of NICs may include more than three NICs. In such embodiments, the method of FIG. 2 would include the additional steps necessary to determine which NIC within the larger team of NICs is faulty. The additional steps would be analogous to those described above.

One advantage of the disclosed technique is that it specifically identifies the NIC within the team of NICs has failed. Another advantage is that the disclosed technique requires each NIC within the team to transmit only one keep-alive packet per keep-alive cycle rather than requiring each NIC to transmit a keep-alive packet to every other NIC within the team per keep-alive cycle. The disclosed technique also avoids the use of multicast and/or broadcast packets, which avoids imposing a burden on the rest of the devices on the local network. Thus, the disclosed technique substantially reduces network traffic relative to prior art techniques, especially as the number of NICs in the team increases or the frequency of keep-alive cycles increases.

Figure 3:
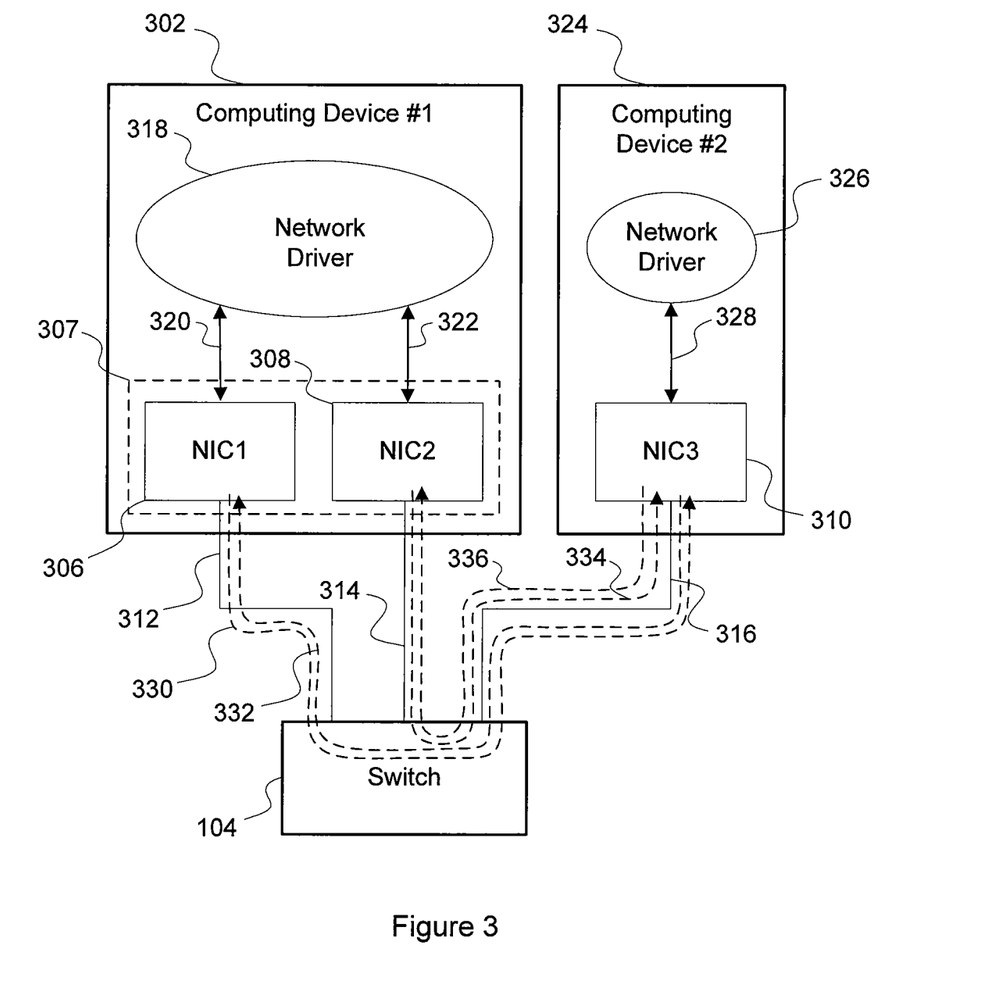
FIG. 3 illustrates a first computing device that includes two NICs configured as a team and a second computing device configured as a third-party helper, according to an alternative embodiment of the invention.

FIG. 3 illustrates a first computing device 302 that includes a first NIC 306 and a second NIC 308 configured as a team 307 and a second computing device 324 configured as a third-party helper, according to an alternative embodiment of the invention. As shown, the first computing device 302 contains a network driver 318 that communicates with the first NIC 306 through a hardware/software interface 320 and with the second NIC 308 through a hardware/software interface 322. The first computing device 302 communicates with other machines within a computer network, such as the third-party helper 324, through network connections 312 and 314 between the first NIC 306 and the second NIC 308, respectively, and a switch 104. The third-party helper 324 includes a third NIC 310 and a network driver 326, which communicates with the third NIC 310 through a hardware/software interface 328. The second computing device 324 communicates with other machines within the computer network through a network connection 316 between the third NIC 310 and the switch 104.

As is well-known, a faulty NIC within a team of two NICs cannot be identified by transmitting keep-alive packets back and forth between the two NICs. For example, suppose the first NIC transmits a keep-alive packet to the second NIC, and the second NIC does not receive the keep-alive packet. Two different failures could account for why the second NIC did not receive the keep-alive packet. First, the transmission capability of the first NIC could be faulty. Second, it is also possible that the reception capability of the second NIC could be faulty. Importantly, though, there is no way to determine which of these failures actually exists without exchanging additional keep-alive packets between each of the two NICs and a third NIC. The third-party helper 324 provides this third NIC. Although the third NIC 310 is external to the team 307, the third-party helper 324 is in the same computer network as the first computing device 302 and therefore is capable of responding to request packets transmitted from the first NIC 306 and the second NIC 308. Thus, the third NIC 310 is able to exchange packets with both the first NIC 306 and the second NIC 308, thereby allowing the third-party helper 324 to confirm the functionality of both the first NIC 306 and the second NIC 308 or to identify which of these two NICs has failed.

As is set forth in greater detail below, the present invention provides a technique for identifying a failed NIC within a team of two NICs (such as the team 307) as well as the nature of the failure (transmit-only versus receive-only capability). The inventive technique may also be used to confirm that both NICs are functioning properly. In this latter scenario, keep-alive response/request packets are exchanged between each of NICs 306 and 308 and NIC 310 in a keep-alive cycle, as set forth in FIG. 3. A first keep-alive request packet is transmitting from the first NIC 306 to the third NIC 310 along a communication path 330, and, in response, a first keep-alive response packet is transmitted from the third NIC 310 to the first NIC 306 along a communication path 332. Similarly, a second keep-alive request packet is then transmitted from the second NIC 308 to the third NIC 310 along a communication path 334, and, in response, a keep-alive response packet is transmitted from the third NIC 310 to the second NIC 308 along a communication path 336. So long as NICs 306 and 308 are fully functional, this series of transmissions is simply repeated at some predetermined frequency. If a potential fault is detected, though, then a more targeted series of keep-alive packet transmissions is used to identify the location and nature of the fault.

The keep-alive packets transmitted between the first and second NICs 306 and 308 and the third NIC 310 may be any type of technically feasible request/response packets, such as ARP (Address Resolution Protocol) packets. ICMP (Internet Control Message Protocol) packets (or "pings") also may be used. Preferably, the request/response packets are of a non-proprietary packet type that is supported by TCP/IP so that any IP device within the network may be used as the third-party helper. In one embodiment, a Masquerade IP Address technique like the one disclosed in U.S. patent application Ser. No. 11/280,134 titled, "Method for Avoiding ARP Cache Pollution" may be used for all ARP request packet transmissions so that ARP cache pollution on the third-party helper may be avoided.

The third-party helper 324 is assumed to be reliable for purposes of confirming the functionality of the first NIC 306 and the second NIC 308 or for identifying which of these two NICs has failed. Therefore, the selection of a machine in the computer network to act as the third-party helper should turn on the reliability of that machine. In one embodiment, the third party helper 324 may be automatically or manually selected to be any reliable machine known to exist on the computer network, such as a [default] gateway, a DHCP (Dynamic Host Configuration Protocol) server or a DNS (Domain Name Service) server. Alternative embodiments may include a hierarchy of third-party helpers (i.e., a primary, a secondary, a tertiary, etc., third-party helper) that would allow an unreliable third-party helper to be replaced by the next third-party helper in the hierarchy. In such a scenario, if the network driver 318 did not receive a response from a particular third-party helper in the hierarchy, then the network driver 318 could transmit a keep-alive probe packet to the next third-party helper in the hierarchy. In another embodiment, the first NIC 306 and the second NIC 308 could transmit "probe packets" to the third-party helper to determine whether the address of the third-party helper is reachable. If neither the first NIC 306 nor the second NIC 308 receives a response, indicating that the third-party helper is unreachable, then the next third-party helper in the hierarchy could be used instead. As persons skilled in the art will appreciate, many different configurations and selections of third-party helpers are possible, and the scope of the present invention is in no way limited to any particular configurations or selections.

Figure 4A:
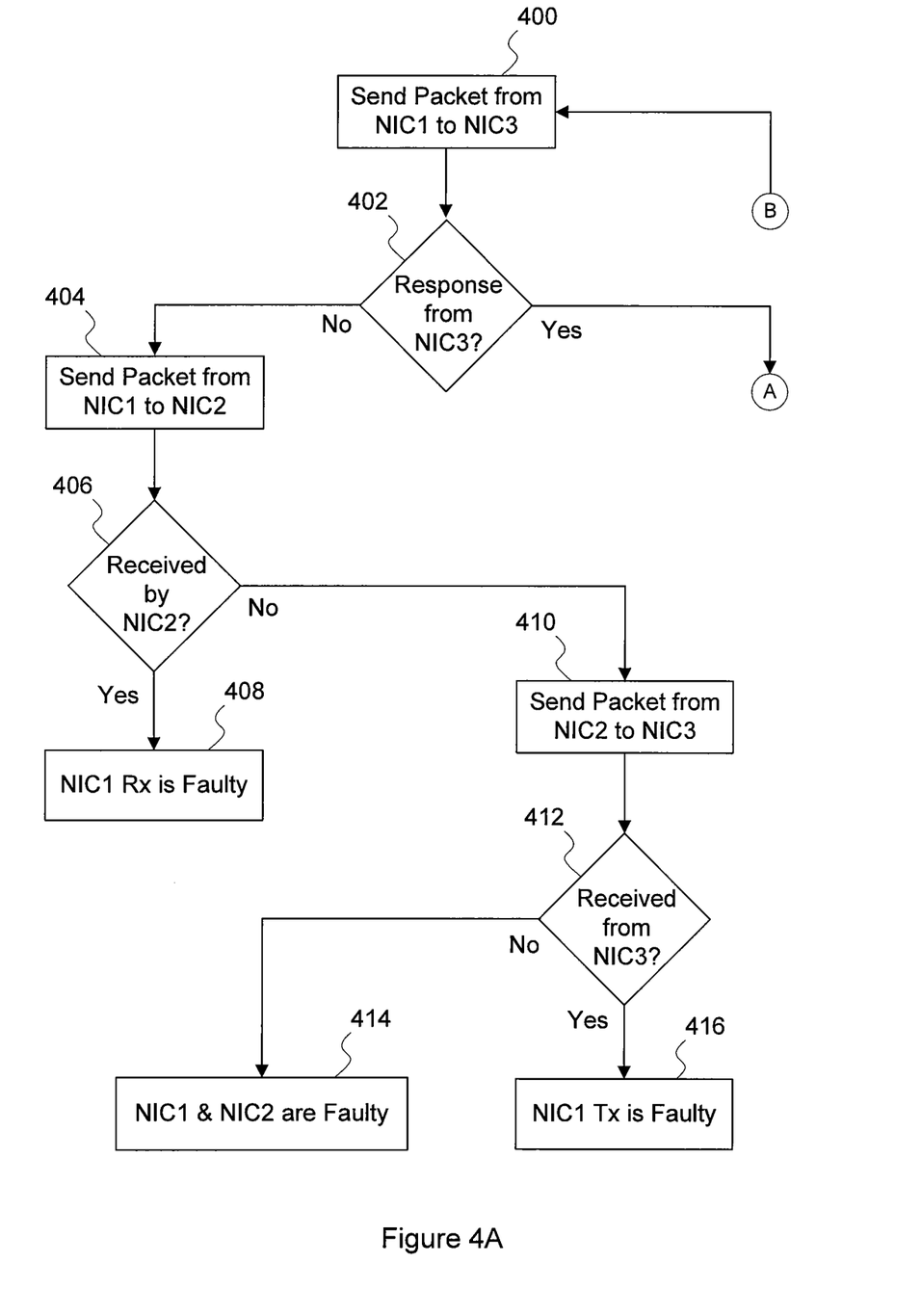
FIGS. 4A and 4B illustrate a flowchart of method steps for identifying a faulty NIC within a team of NICs, according to an alternative embodiment of the invention.
Figure 4B:
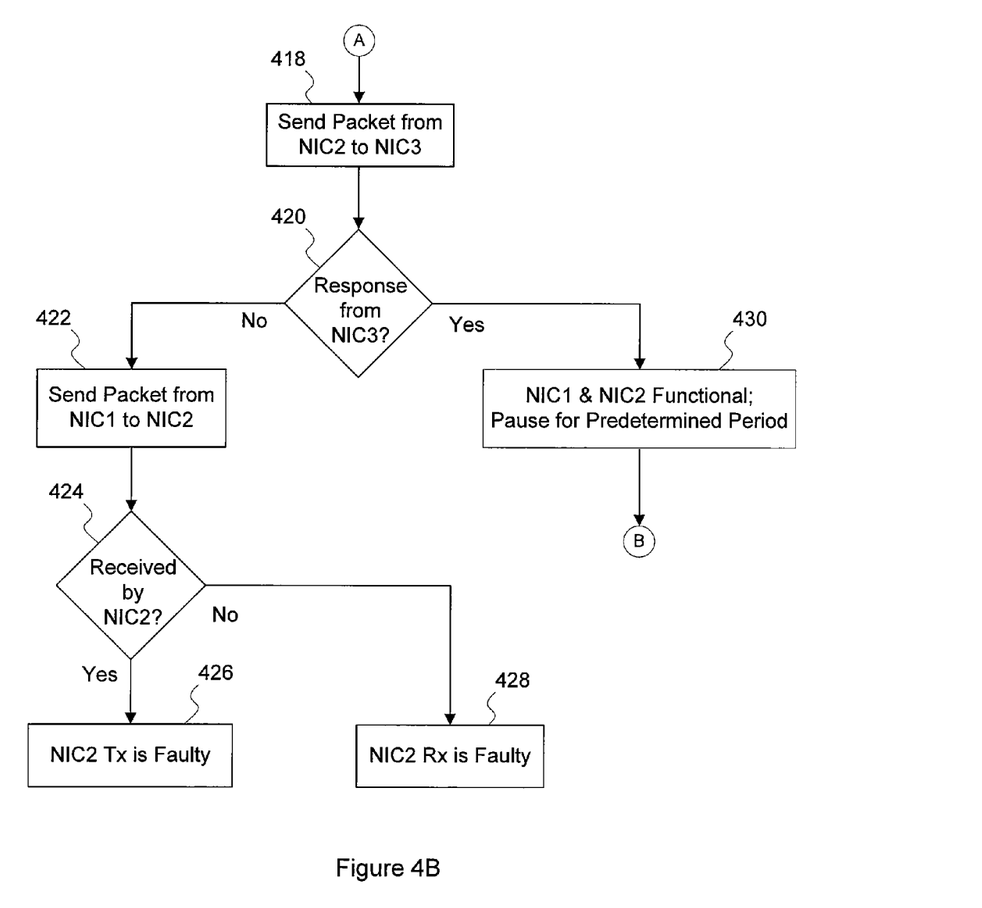

FIGS. 4A and 4B illustrate a flowchart of method steps for identifying a faulty NIC within the team 307 of FIG. 3, according to one embodiment of the invention. Although described in view of FIG. 3, persons skilled in the art will understand that any system configured to perform the method steps, in any order, is within the scope of the invention.

The method begins in step 400, where the network driver 318 transmits an ARP unicast request packet to the third NIC 310 through the first NIC 306. In one embodiment, the third NIC 310 notifies the network driver 326 upon receiving the ARP unicast request packet, causing the network driver 326 to direct the third NIC 310 to send an ARP reply packet to the first NIC 306. In step 402, the network driver 318 determines whether the first NIC 306 received an ARP reply packet from the third NIC 310. In one embodiment, the first NIC 306 notifies the network driver 318 upon receiving the ARP reply packet. If the first NIC 306 receives the ARP reply packet, then the network driver 318 deduces that the transmission and reception capabilities of the first NIC 306 are functional. In step 418, the network driver 318 transmits an ARP unicast request packet to the third NIC 310 through the second NIC 308. In one embodiment, the third NIC 310 notifies the network driver 326 upon receiving the ARP unicast request packet, causing the network driver 326 to direct the third NIC 310 to send an ARP reply packet to the second NIC 308. In step 420, the network driver 318 determines whether an ARP reply packet was received by the second NIC 308. In one embodiment, the second NIC 308 notifies the network driver 318 upon receiving the ARP reply packet. If the second NIC 308 receives the ARP reply packet, then the network driver 318 deduces that the transmission and reception capabilities of the second NIC 308 are functional. In step 430, the network driver 118 combines the deduction of step 402 (that the transmission and reception capabilities of the first NIC 306 are functional) with the deduction of step 420 (that the transmission and reception capabilities of the second NIC 308 are functional) to further deduce that both NICs in the team 307 are fully functional. Further, so that the keep-alive packet exchanges may be repeated on a regular time interval, the network driver 318 pauses for a predetermined period of time and then restarts the method at step 400.

Referring back now to step 402, if the first NIC 306 does not receive an ARP reply packet transmitted by the third NIC 310, then the network driver 318 deduces that either the transmission or reception capability of the first NIC 306 is faulty (based on the assumption that the transmit and receive capabilities of the third NIC 310 are functional). The network driver 318 then begins a fault determination process in step 404 by directing the first NIC 306 to transmit a conventional keep-alive packet to the second NIC 308. In step 406, the network driver 318 determines whether the keep-alive packet was received by the second NIC 308. In one embodiment, the second NIC 308 notifies the network driver 318 upon receiving the keep-alive packet. If the second NIC 308 receives the keep-alive packet, then the network driver 318 deduces that the transmission capability of the first NIC 306 and the reception capability of the second NIC 308 are functional. In step 408, the network driver 318 combines the deduction from step 402 (that either the transmission or reception capability of the first NIC 306 is faulty) with the deduction from step 406 (that the transmission capability of the first NIC 306 and the reception capability of the second NIC 308 are functional) to further deduce that the fault seen in the step 402 is in the reception capability of the first NIC 306, thereby concluding the fault determination process. At this point, the network driver 318 may failover network connections on the faulty first NIC 306 and/or may disable the first NIC 306 to avoid future communication issues. In one embodiment, the driver may choose to suspend use of NIC 108 for normal traffic, but may continue to attempt to engage it in the keep-alive process, so as to deduce when the NIC has returned to fully functional status.

If, in step 406, the second NIC 308 does not receive the keep-alive packet transmitted from the first NIC 306, then the network driver 318 deduces that either the transmission capability of the first NIC 306 is faulty or the reception capability of the second NIC 308 is faulty. The network driver 318 then continues the fault determination process in step 410 by transmitting an ARP unicast request packet to the third NIC 310 through the second NIC 308. In one embodiment, the third NIC 310 notifies the network driver 326 upon receiving the ARP unicast request packet, causing the network driver 326 to direct the third NIC 310 to send an ARP reply packet to the second NIC 308. In step 412, the network driver determines whether the second NIC 308 received an ARP reply packet from the third NIC 310. In one embodiment, the second NIC 308 notifies the network driver 318 upon receiving the ARP reply packet. If the second NIC 308 receives the ARP reply packet, then the network driver 318 deduces that the transmission and reception capabilities of the second NIC 308 are functional. In step 416, the network driver 318 combines the deduction from step 402 (that either the transmission or reception capability of the first NIC 306 is faulty) with the deduction from step 406 (that the transmission capability of the first NIC 306 and the reception capability of the second NIC 308 are functional) and with the deduction from step 412 (that the transmission and reception capabilities of the second NIC 308 are functional) to further deduce that the transmission capability of the first NIC 306 is faulty, thereby concluding the fault determination process. At this point, the network driver 318 may failover network connections on the faulty first NIC 306 and/or may disable the first NIC 306 to avoid future communication issues. As above, in one embodiment, the driver may choose to suspend use of NIC 108 for normal traffic, but may continue to attempt to engage it in the keep-alive process, so as to deduce when the NIC has returned to fully functional status.

If, however, in step 412, the second NIC 308 does not receive the ARP reply packet, then the network driver 318 deduces that either the transmission or reception capability of the second NIC 308 is faulty. In step 414, the network driver 318 combines the deduction from step 402 (that either the transmission or reception capability of the first NIC 306 is faulty) with the deduction from step 412 (that either the transmission or reception capability of the second NIC 308 is faulty) to further deduce that a fault exists in both the first NIC 306 and the second NIC 308, concluding the fault determination process. At this point, the system has no choice but to keep attempting to resume the fault determination process in the expectation that the problem will be resolved enabling resumption of normal communications.

Referring back now to step 420, if the second NIC 308 does not receive the ARP reply packet from the third NIC 310, then the network driver 318 deduces that either the transmission or reception capability of the second NIC 308 is faulty. The network driver 318 then begins a fault determination process in step 422 by transmitting a conventional keep-alive packet to the second NIC 308 through the first NIC 306. In step 424, the network driver 318 determines whether the keep-alive packet was received by the second NIC 308. In one embodiment, the second NIC 308 notifies the network driver 318 upon receiving the keep-alive packet. If the second NIC 308 receives the keep-alive packet, then the network driver 318 deduces that the transmission capability of the first NIC 306 and the reception capability of the second NIC 308 are functional. In step 426, the network driver 318 combines the deduction from step 420 (that either the transmission or reception capability of the second NIC 308 is faulty) with the deduction from step 424 (that the transmission capability of the first NIC 306 and the reception capability of the second NIC 308 are functional) to further deduce that the transmission capability of the second NIC 308 is faulty, thereby concluding the fault determination process. At this point, the network driver 318 may failover network connections on the faulty second NIC 308 and/or may disable the second NIC 308 to avoid future communication issues. As above, in one embodiment, the driver may choose to suspend use of NIC 108 for normal traffic, but may continue to attempt to engage it in the keep-alive process, so as to deduce when the NIC has returned to fully functional status.

If, however, in step 424, the second NIC 308 does not receive the keep-alive packet, then the network driver 318 deduces that either the transmission capability of the first NIC 306 is faulty or the reception capability of the second NIC 308 is faulty. In step 428, the network driver 318 combines the deduction from step 420 (that the transmission or reception capability of the second NIC 308 is faulty) with the deduction from step 422 (that either the transmission capability of the first NIC 306 is faulty or that the reception capability of the second NIC 308 is faulty) to further deduce that the reception capability of the second NIC 308 is faulty, thereby concluding the fault diagnosis process. At this point, the network driver 318 may failover network connections on the faulty second NIC 308 and/or may disable the second NIC 308 to avoid future communication issues. As above, in one embodiment, the driver may choose to suspend use of NIC 108 for normal traffic, but may continue to attempt to engage it in the keep-alive process, so as to deduce when the NIC has returned to fully functional status.

In alternative embodiments, the team of NICs may originally include more than two NICs. In such embodiments, the method of FIGS. 2A-2B could be used to identify faulty NICs within the team until there are only two functional NICs left within the team. Then, the method of FIG. 4 could be used to monitor the last two NICs and, in the event that one of the remaining two NICs subsequently fails, identify which NIC is faulty.

One advantage of the disclosed technique is that it specifically identifies which NIC, within a team of two NICs, has failed—something that cannot be accomplished by simply exchanging keep-alive packets between the two NICs. Thus, the disclosed technique is capable of identifying a fault that was not previously identifiable, providing important diagnostic information for and potentially improving the reliability of computer networks.

Figure 5:
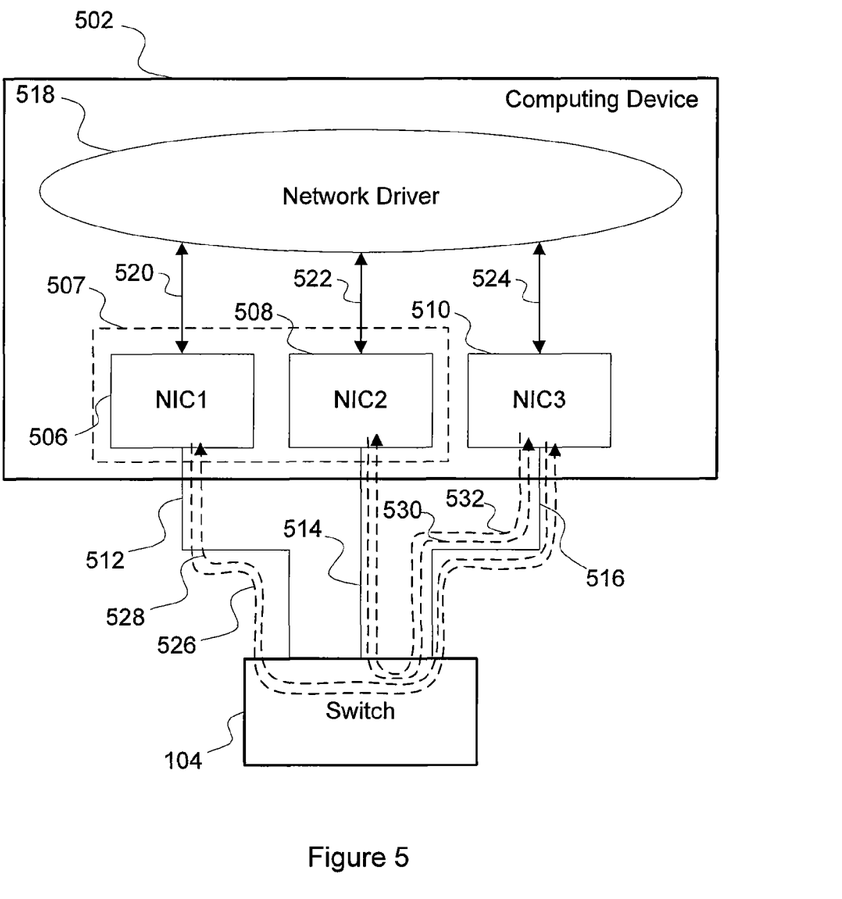
FIG. 5 illustrates a computing device that includes two NICs configured as a team and an independent third NIC configured as a local helper, according to an alternative embodiment of the invention.

FIG. 5 illustrates a computing device 502 that includes a first NIC 506 and a second NIC 508 configured as a team 507 and an independent third NIC 510 configured as a local helper, according to an alternative embodiment of the invention. As shown, the computing device 502 contains a network driver 518 that communicates with the first NIC 506 through a hardware/software interface 520 and with the second NIC 508 through a hardware/software interface 522 and the third NIC 510 through a hardware/software interface 524. The computing device 502 communicates with other machines within a computer network through network connections 512, 514 and 516 between the first NIC 506, the second NIC 508 and the third NIC 510, respectively, and a switch 104.

Here, the third NIC 510 acts as the third-party helper, effectively replacing the second computing device 324 of FIG. 3. The network driver 518 is configured to direct the keep-alive transmissions between the first and second NICs 506 and 508 and the third NIC 510. Thus, during a keep-alive cycle, the network driver 518 transmits a keep-alive request packet to the third NIC 510 through the first NIC 506 along a communication path 526. The third NIC 510 notifies the network driver 518 upon receiving the keep-alive request packet. The network driver 518 subsequently transmits a keep-alive response packet to the first NIC 506 through the third NIC 510 along a communication path 528. The first NIC 506 notifies the network driver 518 upon receiving the keep-alive response packet. Similarly, the network driver 518 transmits a keep-alive request packet to the third NIC 510 through the second NIC 508 along a communication path 530. The third NIC 510 notifies the network driver 518 upon receiving the keep-alive request packet. The network driver 518 subsequently directs the third NIC 510 to transmit a keep-alive response packet to the second NIC 508 along a communication path 532. So long as NICs 506 and 508 are fully functional, this series of transmissions is simply repeated at some predetermined frequency. If a potential fault is detected, though, then a more targeted series of keep-alive packet transmissions is used to identify the location and nature of the fault, as set forth in the method of FIGS. 4A-4B.

Figure 6:
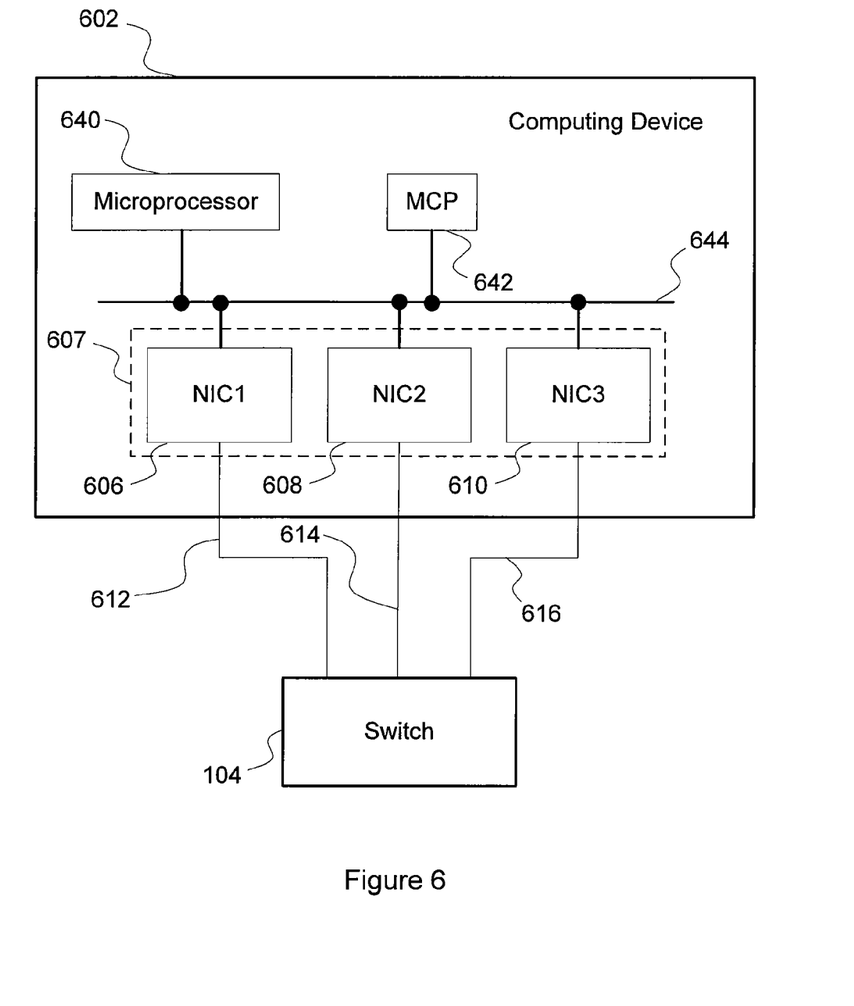
FIG. 6 illustrates a computing device that includes three NICs configured as a team and a Media Control Processor (MCP) device, according to an alternative embodiment of the invention.

FIG. 6 illustrates a computing device 602 that includes a first NIC 606, a second NIC 608 and a third NIC 610 configured as a team 607 and an MCP (Media Control Processor) device 642, according to an alternative embodiment of the invention. As shown, the computing device 602 communicates with other machines within a computer network through network connections 612, 614 and 616 between the first NIC 606, the second NIC 608 and the third NIC 610, respectively, and a switch 104. The computing device 602 further includes a microprocessor 640 and an internal bus 644. The microprocessor 640, the MCP 642 and the first, second and third NICs 606, 608 and 610 are coupled through the bus 644. In this configuration, the MCP 642 may issue commands to the devices on the bus 644, thereby allowing the MCP 642 to direct keep-alive packet exchanges between the first, second and third NICs 606, 608 and 610. Thus, the MCP 642, instead of the network driver, may be used to direct keep-alive transmissions in any of the embodiments of the present invention.

Additionally, the MCP 642 is capable of checking the status of the microprocessor 640 (or any other device on the bus 644) and to initiate a reset of the computing device 602 in the event of a fault with the microprocessor 640. In such embodiments, the MCP 642 may use keep-alive communications of the type described herein to monitor the devices on the bus 644. In alternative embodiments, any type of independent management processing unit may be used to implement the functionality of the MCP 642 described herein.

While the foregoing is directed to embodiments of the present invention, other and further embodiments of the invention may be devised without departing from the basic scope thereof. The scope of the present invention is therefore determined by the claims that follow.

We claim:

1. A method for identifying a failed network interface card (NIC) in a system having a first NIC and a second NIC configured as a team and sharing a first Internet Protocol (IP) address, the method comprising:
    transmitting, by a management processing unit, a first data packet from the first NIC to a third NIC at a second IP address that is different from the first IP address, wherein the third NIC is not a member of the team;
    determining that the first NIC is not faulty based on a first response from the third NIC that is associated with the transmission of the first data packet to the third NIC;
    transmitting a second data packet from the second NIC to the third NIC when the first NIC receives the first response from the third NIC;
    transmitting, by the management processing unit, a third data packet from the first NIC to the third NIC;
    determining that the first NIC is faulty based on determining that the first NIC did not receive a second response from the third NIC that is associated with the transmission of the third data packet to the third NIC; and
    transmitting a fourth data packet from the first NIC to the second NIC when the first NIC does not receive the second response from the third NIC.

2. The method of claim 1, further comprising the step of determining whether the fourth data packet is received by the second NIC.

3. The method of claim 2, wherein the second NIC does not receive the fourth data packet, and further comprising the step of transmitting a fifth data packet from the second NIC to the third NIC.

4. The method of claim 1, further comprising the step of determining whether the second NIC receives a third response from the third NIC that is associated with the transmission of the second data packet.

5. The method of claim 4, wherein the second NIC does not receive the third response associated with the transmission of the second data packet, and further comprising the step of transmitting a fifth data packet from the first NIC to the second NIC.

6. The method of claim 1, wherein the first NIC, the second NIC and the third NIC reside in a first computing device.

7. The method of claim 1, wherein the team consists of the first NIC and the second NIC.

8. A non-transitory computer-readable medium storing instructions for causing a computing device having a first network interface card (NIC) and a second NIC configured as a team and sharing a first Internet Protocol (IP) address to identify a failed NIC, by performing the steps of:
    directing, by a management processing unit, the first NIC to transmit a first data packet to a third NIC at a second IP address that is different from the first IP address, wherein the third NIC is not a member of the team;
    determining that the first NIC is not faulty based on a first response from the third NIC that is associated with the transmission of the first data packet to the third NIC;
    directing the second NIC to transmit a second data packet to the third NIC when the first NIC receives the first response from the third NIC;
    directing, by a management processing unit, the first NIC to transmit a third data packet to the third NIC;
    determining that the first NIC is faulty based on determining that the first NIC did not receive a second response from the third NIC that is associated with the transmission of the third data packet to the third NIC; and
    directing the first NIC to transmit a fourth data packet to the second NIC when the first NIC does not receive the second response from the third NIC.

9. The computer-readable medium of claim 8, further comprising the step of determining whether the fourth data packet is received by the second NIC.

10. The computer-readable medium of claim 9, wherein the second NIC does not receive the fourth data packet, and further comprising the step of directing the second NIC to transmit a fifth data packet to the third NIC.

11. The computer-readable medium of claim 8, further comprising the step of determining whether the second NIC receives a third response from the third NIC that is associated with the transmission of the second data packet.

12. The computer-readable medium of claim 11, wherein the second NIC does not receive the third response associated with the transmission of the second data packet, and further comprising the step of directing the first NIC to transmit a fifth data packet the second NIC.

13. The computer-readable medium of claim 8, wherein the first NIC, the second NIC and the third NIC reside in the computing device.

14. The computer-readable medium of claim 8, wherein the team consists of the first NIC and the second NIC.

15. A computing device having a first network interface card (NIC) and a second NIC configured as a team and sharing a first Internet Protocol (IP) address, the computing device configured to identify a failed NIC in the team, the computing device comprising:
    a memory;
    a central processing unit; and
    a management processing unit configured to:
        direct the first NIC to transmit a first data packet to a third NIC at a second IP address that is different from the first IP address, wherein the third NIC is not a member of the team;
        determine that the first NIC is not faulty based on a first response from the third NIC that is associated with the transmission of the first data packet to the third NIC;
        direct the second NIC to transmit a second data packet to the third NIC when the first NIC receives the first response from the third NIC;
        direct the first NIC to transmit a third data packet to the third NIC;
        determine that the first NIC is faulty based on determining that the first NIC did not receive a second response from the third NIC that is associated with the transmission of the third data packet to the third NIC; and
        direct the first NIC to transmit a fourth data packet to the second NIC when the first NIC does not receive the second response from the third NIC.

16. The computing device of claim 15, wherein the management processing unit is further configured to determine whether the fourth data packet is received by the second NIC.

17. The computing device of claim 16, wherein the second NIC does not receive the fourth data packet, and the management processing unit is further configured to direct the second NIC to transmit a fifth data packet to the third NIC.

18. The computing device of claim 15, wherein the management processing unit is further configured to determine whether the second NIC receives a third response from the third NIC that is associated with the transmission of the second data packet.

19. The computing device of claim 18, wherein the second NIC does not receive the third response associated with the transmission of the second data packet, and the management processing unit is further configured to direct the first NIC to transmit a fifth data packet the second NIC.

20. The computing device of claim 15, wherein the first NIC, the second NIC and the third NIC reside in the computing device.

21. The computing device of claim 15, wherein the team consists of the first NIC and the second NIC.

* * * * *